Oct. 3, 1939.   A. J. WEATHERHEAD, JR., ET AL   2,174,644

METHOD OF MAKING PISTONS

Filed Feb. 15, 1937

INVENTORS.
ALBERT J. WEATHERHEAD, JR.
& CHARLES H. CRAWLEY.
BY
ATTORNEYS.

Patented Oct. 3, 1939

2,174,644

UNITED STATES PATENT OFFICE 2,174,644

METHOD OF MAKING PISTONS

Albert J. Weatherhead, Jr., Cleveland, and Charles H. Crawley, Lakewood, Ohio, assignors to The Weatherhead Company, Cleveland, Ohio, a corporation of Ohio Application February 15, 1937, Serial No. 125,760

11 Claims. (Cl. 29—156.5)

This invention relates to pistons and more particularly to a composite piston wherein the parts of the piston are separately fabricated as distinguished from an integrally cast or forged piston.

It is among the objects of our invention to provide a piston and method of making same in which the parts of the piston are separately fabricated, assembled and securely bonded to each other to provide a sturdy, efficient, light and well balanced article. It is a further object of our invention to provide a piston and method of making same in which the piston skirt portion and the pin bosses or wrist pin bearing portions are separately fabricated and are secured to each other in assembled relation by a copper alloy bond. It is a further object of our invention to provide a piston wherein the head, skirt and pin boss elements are separately fabricated and are simultaneously bonded to each other by copper brazing in a reducing atmosphere. It is a further object of our invention to provide a method of securing pin bosses or wrist pin bearing portions within a piston that will insure proper alignment of same in the finished article. Further objects and advantages relating to novelty in structure and economies in manufacture will appear from the following description and the appended drawing in which:

Figure 1:
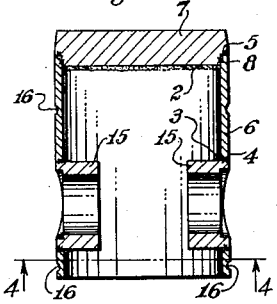
Figure 1 is a sectional elevation taken in the plane of the pin boss axis of a piston constructed according to our invention.
Figure 2:
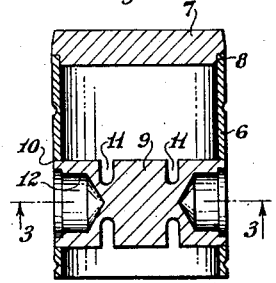
Figure 2 is a sectional elevation taken in the plane of the pin boss axis illustrating a step in the method of forming the piston of Figure 1.
Figure 3:
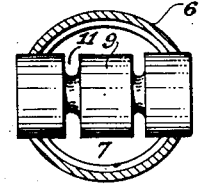
Figure 3 is a transverse sectional view taken along the line 3—3 of Figure 2.
Figure 4:
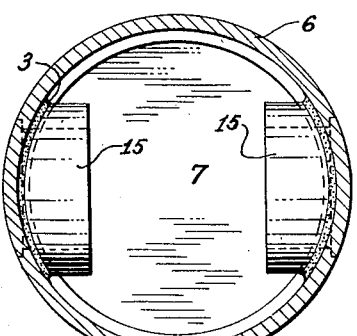
Figure 4 is an enlarged sectional view taken along the line 4—4 of Figure 1.

Generally speaking we have attained the objects referred to above by separately fabricating the skirt portion of a ferrous metal piston, providing the skirt portion with aligned apertures, placing a pin boss forming slug through said apertures, brazing the parts together and thereafter drilling out part of said slug to form opposed bearings for the wrist pin.

More specifically our invention comprises, with reference to Figures 1 to 4 of the drawing, the formation of a ferrous metal cylinder 6 by shearing a blank of such stock from seamless steel tubing or the like, forming a head 7 and fitting the head and skirt to each other by the provision of a sleeve 8 on the head adapted to fit within the upper end of the skirt portion 6. This assembly provides a piston having head 7 and skirt 6 which is drilled to provide opposed pin boss apertures 10 to receive wrist pin bosses. A pin boss slug 9 (Figures 2 and 3) is thereafter fitted within the diametrically opposed apertures 10 formed in the walls of the skirt 6. The pin boss slug 9 may be suitably cut from rod stock or the like and is machined to provide annular grooves 11 and drill guide recesses 12 at each end thereof. The above mentioned three elements comprise the three separately fabricated elements which contribute to the formation of that species of our invention shown in Figures 1 to 4.

Subsequent to the assembly of said three elements they are provided with copper wire or like copper material adjacent the interfitting part of said elements. We have found that the copper brazing material may be applied to the interfitting parts of the piston by copper plating said interfitting parts or by supplying the same with a lacquer containing free copper in suspension. Following the application of the brazing material to the interfitting parts of the piston the piston is suitably supported and arranged within a furnace designed to maintain a temperature of about 2150° F. and a controlled atmosphere of hydrogen or other reducing atmosphere. Under the conditions of heat and atmosphere described a copper alloy bond is formed between the interfitting parts of the piston as at 4 and 5. The copper brazing material when subjected to the temperature mentioned flows freely into every interstice of the interfitting joints of the piston parts and forms an alloy thereat with the ferrous metal of the piston. The surplus brazing material; that is, material in excess of that required to actually flow between the interfitting ferrous parts may form a fillet as at 2 and 3 which improves the bond between the parts.

Figure 7:
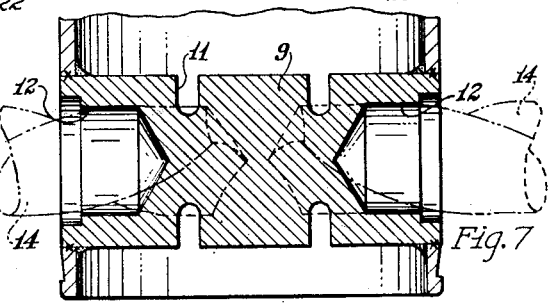
Figure 7 is a sectional view with parts broken away illustrating a forming step employed in making a piston according to our invention.

After removal of the brazed piston from the furnace and the cooling of the same the pin boss slug is subjected to a drilling operation such as illustrated in Figure 7 wherein a pair of drills or boring tools 14 (shown in phantom outline in Figure 7) are guided axially into the pin boss slug 9 by the openings 12. The drilling operation effected by the tools 14 is carried out axially of the blank from each side toward the center a sufficient distance to traverse the grooves 11 formed in the slug and are thereafter withdrawn. It will be observed that the outer diameter of the drill 14 exceeds the inner diameter of the reduced portion or groove 11 of the pin boss slug and thus the central portion of the pin boss slug 9 is free of the piston structure upon removal of the drilling tools and may drop free of the piston and leave therein the opposed wrist pin bosses 15. Although I have shown the pin boss slug 9 as provided with a pair of grooves having an inner diameter less than the outer diameter of the drilling tool, it will be understood that the entire central area of the pin boss slug may be cut away to a depth corresponding to the groove depth and thus provide but a single groove, and that this extended single groove will accomplish a result like that accomplished by the two spaced grooves of the embodiment illustrated.

It will also be understood by those skilled in the art that the central portion of the pin boss slug may be removed by other methods and apparatus than the opposed drills. For instance, a single drill may be advanced through the entire axial extent of the slug or cutting tools may be moved transversely of the slug following the copper brazing operation. The opposed wrist pin bearings 15 are preferably reamed by a single reaming tool subsequent to the drilling to provide accurately aligned bearings for the wrist pin.

In connection with the method we have provided for forming wrist pin bearings 15, it is pointed out that if separate wrist pin bearings were arranged within the apertures 10 of the skirt 6 they would be only frictionally supported therein as cantilever beams prior to brazing and that under the temperatures mentioned as existing within the brazing furnace such individual wrist pin bosses would droop, tilt or fall entirely from the skirt due to the softness therein. It will be appreciated that any misalignment of the pin boss axis would render the piston unfit for its intended functions and would render impossible the proper fitting of the wrist pin within its bearings.

Following the brazing and either before or after the formation of the pin bosses 15 the piston is subjected to the usual finishing operations. In the piston of our invention the finishing operations include the removal of the ends of the slug 9 which project beyond the cylindrical walls of the piston and may include other operations such as heat treating, plating, grinding and the formation of the oil grooves 16. By heat treating as used herein we intend to use such treatment as will accomplish a hardening of the finished article.

Figure 6:
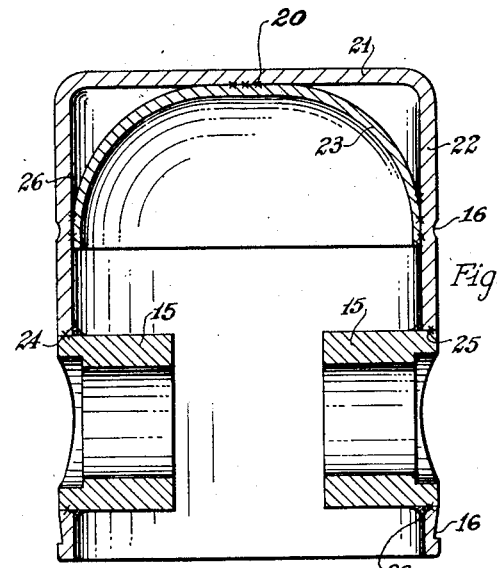
Figure 6 is a sectional elevation taken along the line 6—6 of Figure 5.
Figure 5:
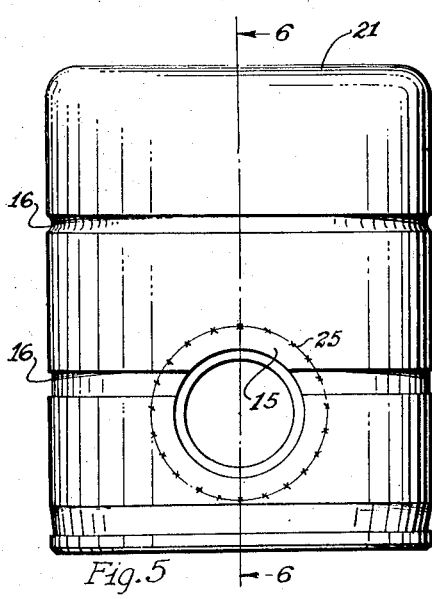
Figure 5 is an elevation of a modified form of piston made according to our invention.

In Figures 5 to 7 we have illustrated another, and in some respects a preferred form of piston, which differs from that of Figures 1 to 4 in that the head 21 and skirt 22 are formed integrally with each other by a deep drawing operation. This method of fabricating the skirt and head portion as a unit is economically suited to certain sizes of pistons. We have found that the head and skirt may be suitably reinforced by the provision of a supplemental or false head 23 which comprises a dome-like drawn cup fitted within the piston and against the head and side walls thereof. The supplemental head 23 is preferably spot welded to the top wall 21 as at 20 to insure proper positioning thereof during the copper brazing operation. Following the fabrication of the head and skirt portions of this species of piston, the pin boss slug 9 heretofore described in detail is arranged within the apertures 24 of the skirt and the brazing material supplied as described in connection with the description of the species shown in Figures 1 to 4. This form of piston is suited to the usual brazing and finishing operations and results in the finished piston illustrated in Figure 5 wherein the fused copper has formed a copper alloy bond as indicated at 25 and 26 (Figure 6).

Although we have shown and described two forms of our invention in considerable detail, it will be understood that we do not wish to be limited to the specific embodiments shown and that the method of our invention is suited to the provision of aligned bearings in articles other than pistons and that variations and modifications may be effected by those skilled in the art without departing from the scope of the invention as defined by the following claims.

We claim:

1. That method of making a piston which comprises forming a cylindrical skirt portion of ferrous metal, forming diametrically opposed apertures in said skirt portion, supporting a unitary pin boss forming slug in said opposed apertures, brazing said slug to said skirt in said apertures and thereafter drilling said slug axially and removing the central portion thereof to provide a pair of spaced aligned wrist pin bosses.

2. That method of forming a piston which comprises shearing a length of ferrous tube stock to provide a cylindrical piston skirt, forming a piston head to close one end of said skirt and drilling apertures in said skirt on a diameter thereof, forming a pin boss slug having an annular groove therein, supporting said slug within said skirt apertures and copper brazing said slug, skirt and head into a unitary structure and thereafter drilling out said pin boss slug and removing the central portion thereof to provide a pair of spaced aligned wrist pin bosses.

3. That method of forming piston pin bosses which comprises forming a pair of diametrically opposed apertures in a piston skirt, providing a pin boss insert formed from bar stock with a diameter corresponding to said opposed skirt apertures and cutting a pair of spaced annular grooves in said insert and thereafter securing said insert to said piston skirt within said apertures, thereafter drilling said insert axially to form an axial bore exceeding the diameter of said insert in said grooved sections whereby the central portion of said insert is freed from the skirt retained end portions and a pair of spaced cylindrical pin bosses remain projecting from the interior walls of said skirt following said drilling operation.

4. That method of forming piston pin bosses which comprises cutting a pair of diametrically opposed apertures in a piston skirt, shaping a piston pin insert by cutting a pair of spaced annular grooves in a length of round rod stock proportioned to span the distance between said piston skirt apertures, securing said pin boss insert within said skirt by brazing the end portions of said insert within said opposed apertures and thereafter drilling said insert to provide an axial bore having a diameter exceeding the diameter of said insert in said grooved sections whereby the central portion of said insert is freed from the skirt retained ends thereof and may be removed from the piston subsequent to the drilling operation to provide a pair of axially aligned spaced opposed wrist pin bosses.

5. That method of forming a pair of aligned bearings in a thin walled article which comprises, forming spaced aligned apertures in the walls of said article and supporting an integrally formed insert in said apertures, permanently securing said insert to the walls of said article and thereafter cutting away a portion of the insert intermediate its ends to leave the secured end portions thereof projecting from said thin walls to provide aligned bearing bosses.

6. That method of forming a pair of spaced aligned bearings in opposed thin walled articles which comprises, forming a pair of spaced aligned apertures in opposed walls of such articles, forming a bearing slug insert proportioned to extend between said apertures with a reduced central portion, supporting the ends of said insert in said apertures and securing said ends therein, thereafter drilling said insert axially to cut into said reduced central portion and free the same from the ends so as to leave said secured drilled ends in alignment with each other and projecting from said walls.

7. That method of forming a piston which comprises deep drawing a metal cup to provide head and skirt portions, forming aligned apertures in said skirt portion and shaping a wrist pin boss insert to span the distance between said apertures, forming a reduced portion intermediate the ends of said insert, securing the ends of said insert within said apertures and thereafter drilling said insert axially into said reduced portion to provide a pair of spaced wrist pin bosses and cut said reduced portion from said insert.

8. That method of forming a piston which comprises deep drawing a metal cup to provide head and skirt portions, drawing a dome-like supplemental head proportioned to fit within said skirt and against said first named head portion, securing said supplemental head within the piston, forming opposed aligned apertures in said skirt portion and shaping an integral pin boss insert to span said apertures with a reduced portion intermediate its ends, copper brazing said insert and supplemental head within the piston and thereafter drilling said insert longitudinally to remove said reduced portion and provide a pair of spaced opposed wrist pin bearings.

9. That method of forming a piston which comprises deep drawing a metal cup to provide head and skirt portions, forming aligned apertures in said skirt portion and shaping a wrist pin boss insert to span the distance between said apertures, forming a reduced portion intermediate the ends of said insert, securing the ends of said insert within said apertures by copper brazing in a reducing atmosphere and thereafter drilling said insert axially into said reduced portion to provide a pair of spaced wrist pin bosses and cut said reduced portion from said insert and with a single reaming tool reaming out the drilled pin bosses to provide accurately aligned wrist pin bearings.

10. That method of making a piston which comprises forming a cylindrical skirt portion of ferrous metal, cutting a pair of diametrically opposed apertures in said skirt portion, supporting a unitary pin boss forming slug in said opposed apertures, permanently securing said slug within said apertures and thereafter removing the central portion of the slug to provide a pair of spaced aligned pin bosses.

11. That method of forming a pair of spaced aligned bearings in thin walled articles having opposed walls which comprises forming a pair of spaced aligned apertures in said opposed walls, forming a bearing slug insert proportioned to extend between said apertures with a reduced central portion, supporting the ends of said insert in said apertures and copper brazing said ends therein, thereafter drilling said insert axially to cut into said reduced central portion and free the same from the ends secured to the walls to leave said secured drilled ends in alignment with each other and projecting from the walls.

ALBERT J. WEATHERHEAD, Jr.
CHARLES H. CRAWLEY.